UNITED STATES PATENT OFFICE.

DAVID ALLISTON LEGG, OF LONDON, ENGLAND, ASSIGNOR TO MATTHEW ATKINSON ADAM, OF LONDON, ENGLAND.

MANUFACTURE OF BUTYRIC ALDEHYDE.

1,418,448.  Specification of Letters Patent.  Patented June 6, 1922.

No Drawing.  Application filed November 22, 1921. Serial No. 517,072.

*To all whom it may concern:*

Be it known that I, DAVID ALLISTON LEGG, a subject of the King of Great Britain and Ireland, and residing at 10ª Featherstone Buildings, London, W. C. 1, England, have invented certain new and useful Improvements in and Relating to the Manufacture of Butyric Aldehyde, of which the following is a specification.

This invention relates to the production of butyric aldehyde and has for its object to provide an improved or modified process for the production of these bodies from normal primary butyl alcohol.

The invention consists in the conversion of normal primary butyl alcohol to butyric aldehyde by dehydrogenation by means of a fused cupric oxide catalyst or a copper catalyst obtained therefrom.

The oxidation of butyric aldehyde can be used to produce butyric acid.

The invention also consists in a process for the production of butyric aldehyde from normal primary butyl alcohol, according to which the normal butyl alcohol is passed over a dehydrogenating catalyst of the kind referred to above, the resultant mixture of butyric aldehyde and butyl alcohol being fractionated to separate the butyric aldehyde.

The invention also consists in the processes for the preparation of butyric aldehyde hereinafter described.

In this specification and claims where I refer to a fused cupric oxide catalyst this is to be understood as a catalyst which at some stage passes through the phase of fusing cupric oxide, that is to say, cupric oxide itself may be employed as the starting material and fused or a salt capable of producing cupric oxide on heating may be employed such as copper carbonate, for example, this being raised to the fusing temperature of cupric oxide.

Further, where I refer to a copper catalyst obtained from a fused cupric oxide catalyst, this may be secured by reducing the fused cupric oxide catalyst, say, in an atmosphere of hydrogen and in the present specification and claims where I refer to a cupric oxide catalyst I include also such reduced catalyst which may consist of copper or a mixture of copper and an oxide or oxides of copper.

In carrying the invention into effect in one form by way of example, for the preparation of butyric aldehyde, normal primary butyl alcohol is passed in a state of vapour over a fused cupric oxide catalyst or a copper catalyst obtained therefrom prepared as described in British Patent No. 166249. The temperature of the catalyst and vapour is maintained at between 200° and 350° C., preferably at about 280° to 320° C. The vapours pass to a condenser and are there condensed and separated from hydrogen. The resultant butyric aldehyde may be separated from any unchanged butyl alcohol by distillation and the latter returned to the catalyzers.

It is possible with this catalyst to obtain a high percentage conversion in one passage over the catalyst layer at a good rate of speed. Thus, in a ¾" copper tube, packed for 26" of its length with fused cupric oxide, it was possible while working at 300° C. to pass through 240 ccs. per hour of normal butyl alcohol, and obtain 75 per cent. conversion in one passage.

Methods for the production of butyric aldehyde from normal primary butyl alcohol as described above are well adapted for large scale practical working.

Having now described my invention, what I claim as new and desire to secure by Letters Patent is:—

1. A method for the production of butyric aldehyde which consists in the dehydrogenation of normal primary butyl alcohol by means of a fused cupric oxide catalyst.

2. A method of producing butyric aldehyde which comprises subjecting vaporized normal primary butyl alcohol, to the action of a catalyst comprising fused cupric oxide, at a temperature between about 200 and 350° C.

3. A method of producing butyric aldehyde which comprises subjecting vaporized normal primary butyl alcohol, to the action of a catalyst comprising fused cupric oxide, at a temperature between 280 and 320° C.

In testimony whereof I have signed my name to this specification.

DAVID ALLISTON LEGG.